Oct. 2, 1934.   G. L. SCOWN ET AL   1,975,669
MEAT TENDERER
Filed April 20, 1933
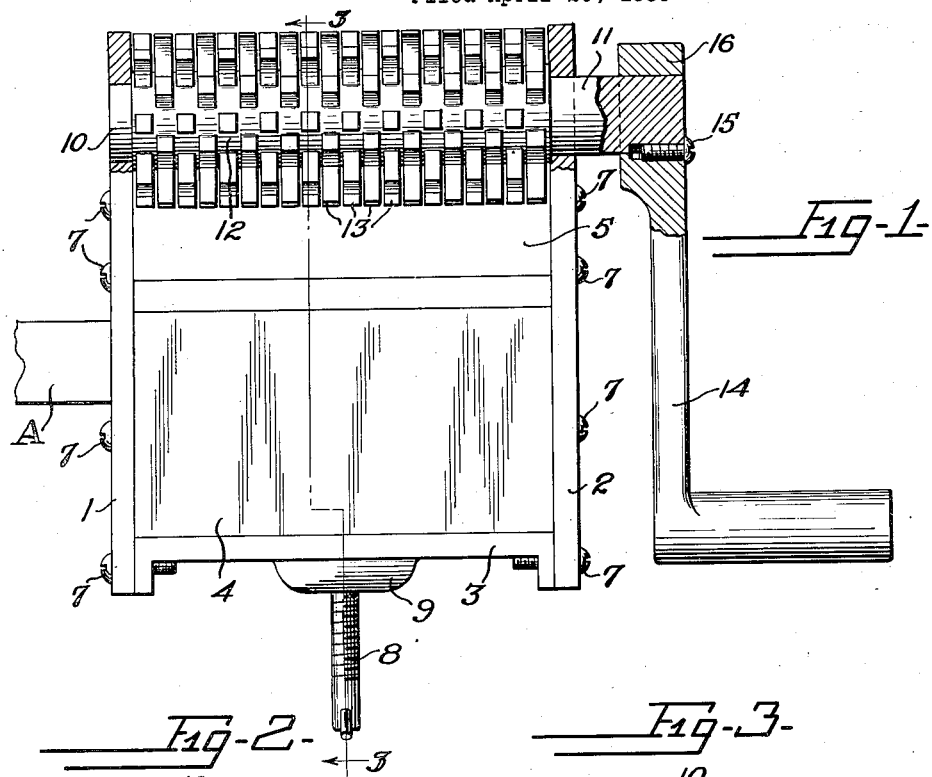
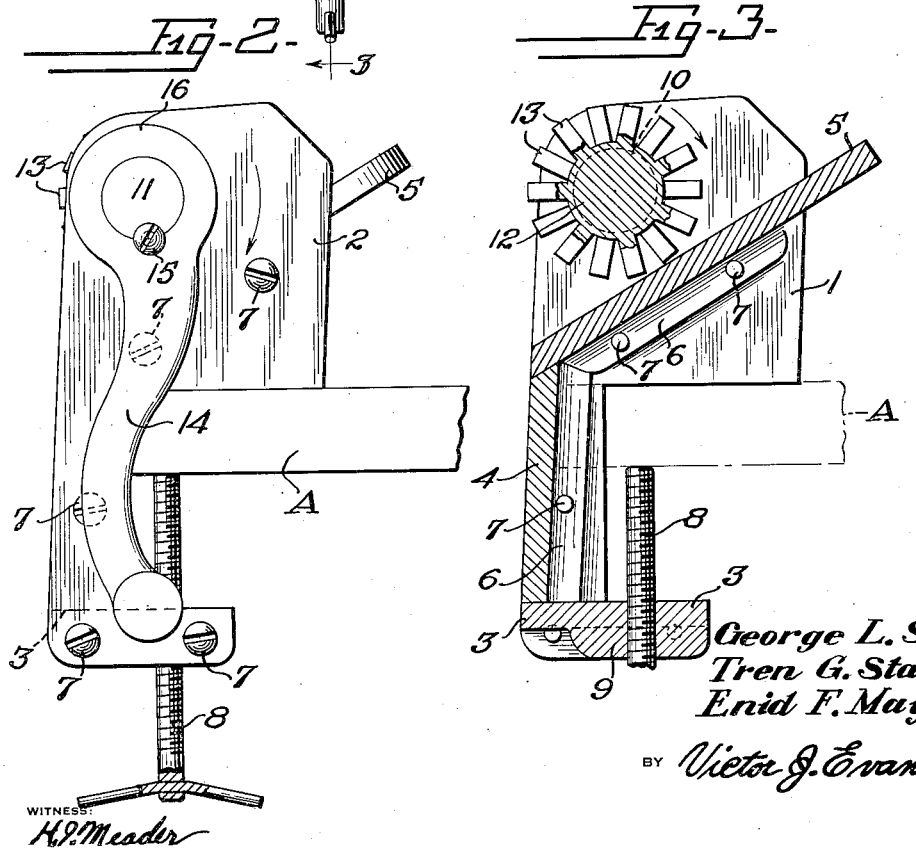
George L. Scown,
Tren G. Stargel,
Enid F. Mayer, INVENTORS
BY Victor J. Evans & Co.
ATTORNEYS
WITNESS:
H. I. Meader Patented Oct. 2, 1934

1,975,669

UNITED STATES PATENT OFFICE 1,975,669

MEAT-TENDERER

George L. Scown, Tren G. Stargel, and Enid F. Mayer, Amarillo, Tex.

Application April 20, 1933, Serial No. 667,068

1 Claim. (Cl. 17—25)

This invention relates to meat tenderers and its general object is to provide a device of that character which is primarily designed for treating tough cuts of meat such as steaks and the like, to render the same palatable.

A further object of the invention is to provide a meat tenderer that does not merely punch holes in the meat or make incisions and the like therein, but actually changes the character thereof by completely destroying or breaking up the sinews, tendons, muscular fibers or the like without loss of the juices from the meat or materially changing the thickness thereof.

Another object of the invention is to provide a meat tenderer that is capable of being operated in an easy and expeditious manner and can be cleaned and kept in a sanitary condition with very little effort.

A still further object of the invention is to provide a meat tenderer, that is simple in construction, inexpensive to manufacture and is extremely efficient in operation and service.

This invention also consists in certain other features of construction and in the combination and arrangement of the several parts, to be hereinafter fully described, illustrated in the accompanying drawing and specifically pointed out in the appended claim.

In describing our invention in detail, reference will be had to the accompanying drawing wherein like characters denote like or corresponding parts throughout the several views, and in which:

Figure 1 is a front view of the device which forms the subject matter of the present invention with a part broken away.

Figure 2 is an end view thereof.

Figure 3 is a sectional view taken approximately on line 3—3 of Figure 1, looking in the direction of the arrows.

Referring to the drawing in detail, it will be noted that our device is made up of separable parts providing a frame that includes side walls 1 and 2 having openings therein through which pass screw bolts for securing the base plate 3, front plate 4, and feed plate 5 thereto as clearly shown in Figure 3. These respective plates are provided with flanges 6 formed with the ends thereof and extending at right angles thereto and the flanges have threaded openings therein to accommodate the screw bolts that are indicated by the reference numeral 7 and which may have wing heads so as to facilitate their application or removal without the use of tools, as will be apparent.

Each of the side walls is provided with a relatively large recess extending into one of the sides thereof and these recesses are aligned with each other, so that the device can be applied to a table top or the like A as best shown in Figure 2.

In order to secure the device to the table top A we provide a thumb screw 8 that is threaded through the base plate 3 and centrally through a boss 9 which is formed on the bottom of the base plate to materially reinforce the same, as clearly shown in Figure 3. It will be obvious that the thumb screw may have a head thereon but in any event is adapted to be disposed in engagement with the bottom of the table top.

The side walls may be otherwise of any desired shape, but have disposed therein adjacent to the upper ends as well as to the front edges thereof aligned openings which provide bearings for the stub shafts 10 and 11 that extend from the opposite ends of a cylinder 12 which is preferably solid as shown in Figure 3, but in any event has radiating therefrom a plurality of teeth 13 that are arranged in alternate staggered rows or in other words the teeth of one row is disposed in a line between the teeth of its adjacent rows, as clearly shown in Figure 1.

The teeth are solid and may be relatively long and rectangular as shown, but in any event they are provided with flat outer faces, with four cutting edges, and may be cast integral with the cylinder 12, as shown in Figure 3.

The feed plate 5 is disposed at an inclination and in close proximity to the cutting edges of the teeth 13. In fact, only a minute space is provided between the feed plate and the forward and rearward cutting edges of the teeth 13 so that the teeth will barely miss the plate during the rotation of the cylinder.

The cylinder is rotated through the instrumentality of the crank handle 14 that is secured to the stub shaft 11 by a screw bolt 15, the latter being threadedly received in a bore which is partially made in the stub shaft 11 and the collar 16 of the crank handle, as shown in Figure 1.

From the above description and disclosure of the drawing, it will be obvious that we have provided a meat tenderer that completely destroys or breaks up the sinews, muscular fibers and the like of cuts of meat when being passed between the feed plate 5 and the teeth 13 of the cylinder 12, due to the action of the teeth 13 upon the meat, and the meat is not only fed by gravity, but the teeth will draw the meat between the same and therefore assist the operator in feeding the meat through the device.

We desire it to be understood that we may make changes in the construction and in the combination and arrangement of the several parts, provided that such changes fall within the scope of the appended claim.

What we claim is:

A meat treating device comprising a frame including side walls recessed for a portion of their width, with the recesses aligned with each other and entering from the rear of the side walls above the lower ends thereof, a base plate, a front plate and a feed plate, flanges formed on the ends of each plate and disposed at right angles thereto, said plates bridging the side walls with the flanges contacting the same, means extending through the flanges for securing the plates to the side walls, means in the lower plate for securing the device to a suitable support with the latter disposed in the aligned recesses and engageable with the upper ends thereof, a tooth bearing cylinder mounted for rotation above the feed plate, means for rotating the cylinder, and the teeth of the cylinder having flat faces providing cutting edges that substantially contact the feed plate during the rotation of the cylinder.

GEORGE L. SCOWN.
TREN G. STARGEL.
ENID F. MAYER.